(12) United States Patent
Beck et al.

(10) Patent No.: US 7,013,354 B1
(45) Date of Patent: Mar. 14, 2006

(54) CHANNEL PROTOCOL FOR IEEE 1394 DATA TRANSMISSION

(75) Inventors: Gregory F. Beck, Laguna Hills, CA (US); Wei Zhou, Irvine, CA (US); Royce Earle Slick, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/166,488

(22) Filed: Oct. 5, 1998

(51) Int. Cl.
  *F06F 13/42* (2006.01)

(52) U.S. Cl. ........................ 710/105; 710/100; 710/105; 710/305; 710/315; 370/351

(58) Field of Classification Search ................. 710/105, 710/100, 106, 305, 306, 314, 313, 319, 62, 710/63, 64, 65, 72, 315, 379; 370/351, 389, 370/400; 326/86; 361/785; 709/321
  See application file for complete search history.

(56) References Cited

U.S. PATENT DOCUMENTS

| | | | | |
|---|---|---|---|---|
| 4,742,511 A | * | 5/1988 | Johnson | 370/406 |
| 5,161,857 A | * | 11/1992 | Mayercheck et al. | 299/30 |
| 5,325,355 A | | 6/1994 | Oprescu et al. | 370/24 |
| 5,335,325 A | * | 8/1994 | Frank et al. | 711/153 |
| 5,383,187 A | * | 1/1995 | Vardakas et al. | 370/312 |
| 5,384,808 A | | 1/1995 | Van Brunt et al. | 375/36 |
| 5,394,556 A | | 2/1995 | Oprescu | 395/800 |
| 5,400,340 A | | 3/1995 | Hillman et al. | 370/105.3 |
| 5,408,501 A | | 4/1995 | Cornaby | 375/260 |
| 5,412,697 A | | 5/1995 | Van Brunt et al. | 375/360 |
| 5,412,698 A | | 5/1995 | Van Brunt et al. | 375/373 |
| 5,424,657 A | | 6/1995 | Van Brunt et al. | 326/63 |

(Continued)

OTHER PUBLICATIONS

Tomoaki Takazawa, Yoriko Utsunomiya, Yota Komoriya, Masaki Bandai, and Iwao Sasase, "VBR Video Transmission with Isochronous and Asynchronous Transfer Mode over Wireless 1394", 2002, Keio University.*
Distributed Systems Group, "Packet: Header and Data", 1997, Technische University.*
IEEE Computer Society, IEEE Standard for a High Performance Serial Bus, 1995, Institute of Electrical and Electronics Engineers, Inc., pp 18, 146.*
Daniel Moore, IEEE 1394 The Cable connection to Complete The Digital Revolution, 1997, VXM Network.*
TechEncyclopedia, TCP/IP abc's, TechWeb.*
Wetzel, Alan, "IEEE 1394, the Cable connection to Complete the Digital Revolution" Jul., 7, 1997.*
Mitchell, Danny, "1394 Software Transaction Layer and Bus Management," Texas Instruments, Feb. 18, 1998, pp. 1–40.
Wright, Maury, "EDN Hands–On–Project: Firewire Unleashes The Power of Digital Video," EDN, Jul. 3, 1997, pp. 45–57.

*Primary Examiner*—Glenn A. Auve
*Assistant Examiner*—Justin King
(74) *Attorney, Agent, or Firm*—Fitzpatrick, Cella, Harper & Scinto

(57) ABSTRACT

A system for transmitting and receiving data formatted in IEEE 1394 standard between devices using a same IEEE 1394 broadcast channel includes a CPU interfaced to a bus, a first 1394 interface connected to the bus via a first physical and link layers, and a second 1394 interface connected to the bus via a second physical and link layer. The CPU is configured for 1) receiving data from the bus, prefixing a header to the received data, and retransmitting the received data with the prefixed header onto the bus; and 2) receiving data prefixed with a header, interpreting the header to identify which of the first or second interfaces should receive the data, and transmitting the data over the bus to the identified 1394 interface.

34 Claims, 8 Drawing Sheets

U.S. PATENT DOCUMENTS

| | | | |
|---|---|---|---|
| 5,442,630 A | * 8/1995 | Gagliardi et al. | 370/402 |
| 5,483,518 A | 1/1996 | Whetsel | 370/13 |
| 5,483,656 A | 1/1996 | Oprescu et al. | 395/750 |
| 5,485,458 A | 1/1996 | Oprescu et al. | 370/85.2 |
| 5,485,488 A | 1/1996 | Van Brunt et al. | 375/257 |
| 5,493,570 A | 2/1996 | Hillman et al. | 370/105.3 |
| 5,493,657 A | 2/1996 | Van Brunt et al. | 395/308 |
| 5,495,481 A | 2/1996 | Duckwall | 370/85.2 |
| 5,504,458 A | 4/1996 | Van Brunt et al. | 330/255 |
| 5,504,757 A | 4/1996 | Cook et al. | 370/84 |
| 5,509,126 A | 4/1996 | Oprescu et al. | 395/307 |
| 5,535,208 A | 7/1996 | Kawakami et al. | 370/84 |
| 5,559,967 A | 9/1996 | Oprescu et al. | 395/285 |
| 5,568,192 A | 10/1996 | Hannah | 348/222 |
| 5,579,486 A | 11/1996 | Oprescu et al. | 395/200.15 |
| 5,581,541 A | 12/1996 | Whetsel | 370/241 |
| 5,606,268 A | 2/1997 | Van Brunt | 326/68 |
| 5,615,404 A | 3/1997 | Knoll et al. | 395/882 |
| 5,617,420 A | 4/1997 | Whetsel | 370/402 |
| 5,619,541 A | 4/1997 | Van Brunt | 375/360 |
| 5,619,646 A | 4/1997 | Hoch et al. | 395/200.01 |
| 5,621,901 A | 4/1997 | Morriss et al. | 395/306 |
| 5,630,173 A | 5/1997 | Oprescu | 395/860 |
| 5,632,016 A | 5/1997 | Hoch et al. | 395/200.02 |
| 5,633,871 A | 5/1997 | Bloks | 370/471 |
| 5,634,010 A | * 5/1997 | Ciscon et al. | 709/223 |
| 5,640,521 A | 6/1997 | Whetsel | 395/311 |
| 5,646,941 A | 7/1997 | Nishimura et al. | 370/389 |
| 5,661,395 A | 8/1997 | Johnson et al. | 323/273 |
| 5,675,139 A | 10/1997 | Fama | 235/472 |
| 5,682,484 A | 10/1997 | Lambrecht | 395/308 |
| 5,687,319 A | 11/1997 | Cook et al. | 395/200.13 |
| 5,689,244 A | 11/1997 | Iijima et al. | 340/825.07 |
| 5,689,507 A | 11/1997 | Bloks et al. | 370/389 |
| 5,754,548 A | * 5/1998 | Hoekstra et al. | 370/402 |
| 5,919,261 A | * 7/1999 | Aoki et al. | 713/300 |
| 5,937,175 A | * 8/1999 | Sescila et al. | 710/305 |
| 5,963,431 A | * 10/1999 | Stancil | 361/803 |
| 6,061,746 A | * 5/2000 | Stanley et al. | 709/321 |
| 6,211,800 B1 | * 4/2001 | Yanagihara et al. | 341/50 |
| 6,219,697 B1 | * 4/2001 | Lawande et al. | 709/221 |
| 6,341,319 B1 | * 1/2002 | Inoue et al. | 710/52 |
| 6,480,889 B1 | * 11/2002 | Saito et al. | 709/220 |
| 6,496,509 B1 | * 12/2002 | Fant | 370/400 |
| 6,584,103 B1 | * 6/2003 | Hanaoka et al. | 370/389 |
| 6,611,155 B2 | * 8/2003 | Sterrantino | 326/86 |
| 6,639,914 B1 | * 10/2003 | Choi et al. | 370/389 |
| 6,718,424 B1 | * 4/2004 | Cruz | 710/315 |

\* cited by examiner

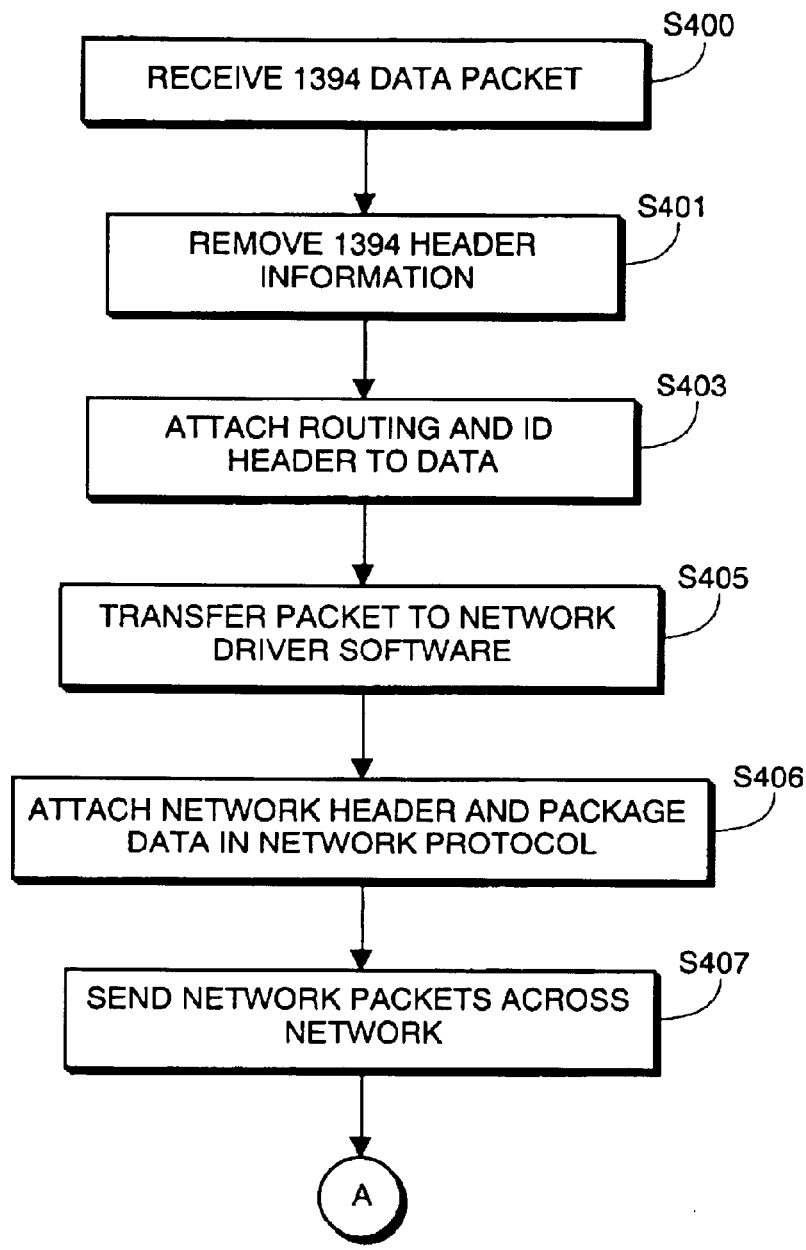

CHANNEL PROTOCOL FOR IEEE 1394 DATA TRANSMISSION

BACKGROUND OF THE INVENTION

1. Field of the Invention

The present invention relates to a system for transmitting and receiving data over a bus in which the data is formatted in IEEE 1394 standard and in which the data is sent and received over the same IEEE 1394 channel.

2. Incorporation by Reference

This application incorporates by reference commonly assigned U.S. patent application Ser. No. 09/166,487, entitled "Digital Video Network Interface" (internal reference No. MOI-328/360), the disclosure of which is herein incorporated by reference, as if set forth in full.

3. Description of the Prior Art

The IEEE 1394 standard bus (1394 bus) provides for isochronous transmission of data packets, which are sent and received every 125 microseconds in correspondence to one cycle. A maximum of 64 isochronous packets can be sent over the bus per cycle. As a result, any device that uses the IEEE 1394 standard for isochronous transmission of data, is assigned an isochronous channel, ranging in value from 0 to 63. The channel is assigned to a specific device until it is released by that device. In this regard, when the 1394 bus is initialized, a node identifier is automatically assigned to each device (such as a digital video camera) that uses the bus as a means of identifying each node.

To achieve isochronous transmission on plural channels, the IEEE 1394 specification (IEEE 1394–1995) reserves one of the plural nodes connected to the bus so that it is used for isochronous resource management, a function that is supported by a software layer (to be discussed in greater detail below). This node is known as the "Isochronous Resource Manager". The Isochronous Resource Manager manages the channel numbers used for isochronous transmission, and the time remaining in each cycle that is usable for isochronous transmission. This available remaining time to transfer additional isochronous data within each cycle is called channel bandwidth. The Isochronous Resource Manager reserves the channel bandwidth and channel numbers (0-63) needed by 1394 bus nodes for isochronous transmission. Upon power-up, each device (node) that needs to transmit data isochronously issues a request to the Isochronous Resource Manager. In particular, a node designed to transmit isochronous data must first determine if there is an unused channel and available bandwidth for that purpose. The node typically makes a request to the Isochronous Resource Manager to determine if there are isochronous channels available and bandwidth available, in order to obtain a unique channel and bandwidth allocation.

In the case that two or more nodes desire to use the same channel, the first node requesting access to an available channel will be assigned that channel. For example, if two nodes request access to channel 63, only the node whose request reaches the Isochronous Resource Manager first will be assigned to channel 63. All other nodes will be locked out from using channel 63 until the device using channel 63 releases the channel.

The problem of attempting to use the same channel occurs not only when more than 64 devices are attempting to access the 1394 bus, but can also arise even if only two or more digital video cameras are being used on the same 1394 bus. That is, many different digital video cameras are designed to transmit over a single preset channel number, or "broadcast channel" for transmitting digital video data packets over the 1394 bus. The "broadcast channel" concept is described in U.S. Pat. No. 5,535,208, entitled "Data Transmission System And Method", Kawakami et al, assigned to Matsushita. This broadcast channel, as defined by this patent, has in practice become the first available isochronous channel, or channel 63. However, because the IEEE 1394 standard does not allow more than one node to use the same isochronous channel at one time, only one of the digital video cameras is permitted isochronous bandwidth and use of channel 63 to perform transmission of isochronous data on the bus. As a result of this conflict, two or more digital video cameras connected to the same 1394 bus cannot be used in a bi-directional video conferencing configuration, because at the sending and receiving sides, only one camera will be able to send data per bus.

Therefore, in any configuration where multiple digital video cameras (which have adopted the "broadcast channel" concept standard of U.S. Pat. No. 5,535,208) are attempting to transmit isochronous data on a 1394 bus, only one camera will be able to send isochronous data and all others will be locked out from sending isochronous data on the bus.

Although the problems with the assignment of channels have been disclosed with respect to digital video cameras, it should be understood that the same problem applies in the case of other IEEE 1394 devices, such as scanners, digital video disks, compact disks, set-top boxes, computers, or any other devices that wish to isochronously transmit data on conflicting channels. Also, this problem would apply in the case that all 64 channels have been already assigned and a new device is attempting to utilize a channel that has already been assigned.

Heretofore, it has not been possible to send/receive data over the same 1394 bus when more than one device is attempting to use a single broadcast channel, for example, channel 63, of the 1394 bus. Accordingly, it is desirable to have a system that permits two or more devices to transmit or receive data using the same channel over a 1394 bus, so that transmitting data over a local data bus or a local area network by more than one device using the same broadcast channel becomes possible.

SUMMARY OF THE INVENTION

It is an object of the present invention to provide a network interface which can interface with a local data bus or local area network and at least two peripheral devices which share identical IEEE 1394 broadcast channels. The present invention provides an individual 1394 bus for each device using the network interface together with its own 1394 link layer.

Thus, according to one aspect of the invention, a system for transmitting and receiving data formatted in IEEE 1394 standard between devices using a same IEEE 1394 broadcast channel includes a controller interfaced to an internal bus, a first 1394 interface connected to the bus via first physical and link layers, a first device using a broadcast channel and connected to the first interface, a second 1394 interface connected to the bus, and a second device using the broadcast channel and connected to the second interface. The controller is configured for 1) receiving data transmitted from one of the first and second devices via the bus, attaching an identification (ID) header, which includes identification information corresponding to a recipient device determined based at least in part on which of the first and second devices transmitted the data, to the received data and retransmitting the received data with the ID header onto the bus, and 2) receiving data with the ID header attached thereto, interpreting the ID header to identify which of the first or second interfaces should receive the data, and transmitting the data over the bus to the identified 1394 interface. The ID header, which is other than a 1394 interface. The ID header, which is other than a 1394 header, is used to build the 1394 header based on information contained in the ID header.

According to another aspect of the invention, in a system for transmitting and receiving data formatted in IEEE 1394 standard between devices using a same IEEE 1394 broadcast channel, the system includes a controller interfaced to a bus, a first 1394 interface connected to the bus, a first device using a broadcast channel and connected to the first interface, a second 1394 interface connected to the bus, and a second device using the broadcast channel and connected to the second interface. The controller is configured for receiving data transmitted over the bus and routing the data to either the first or second 1394 interface based on the received data using an identification (ID) header other than a 1394 header, the ID header contains information about the data and identification information corresponding to one of the first and second devices determined based at least in part on a transmitting device. The 1394 header is built based on information contained in the ID header.

In yet another aspect of the invention, the present invention provides a system for transmitting and receiving data packets formatted in IEEE 1394 standard, the system includes a controller interfaced to an internal bus, a first device using a broadcast channel and connected to the first interface, a second interface connected to the bus, and a second device using the broadcast channel and connected to the second interface. The controller is configured for 1) receiving data transmitted from one of the first and second devices via the bus, attaching an identification (ID) header and a subheader to the recieved data, the ID header including identification information corresponding to a recipient device determined based at least in part on which of the first and second devices transmitted the data, and retransmitting the received data with the ID header and subheader onto the bus, and 2) receiving data with ID header and subheader attached thereto, interpreting the ID header and subheader to identify which of the first or second interfaces should receive the data and which broadcast channel in the identified interface should receive the data, and transmitting the data over the bus to the identified interface. The ID header, which is other than a 1394 header formatted in IEEE 1394 standard and contains information about the data, is used to build the 1394 header based on information contained in the ID header.

These and other features and advantages according to the present invention will be more readily understood by reference to the following detailed description of the preferred embodiment taken in conjunction with the attached drawings.

BRIEF DESCRIPTION OF THE DRAWINGS

FIG. 3, comprising

FIG. 4, comprising FIGS. 4A and 4B, is a flowchart depicting the transfer and receipt of video data in the bi-directional video teleconferencing system according to the present invention;

DETAILED DESCRIPTION OF THE INVENTION

Figure 1:
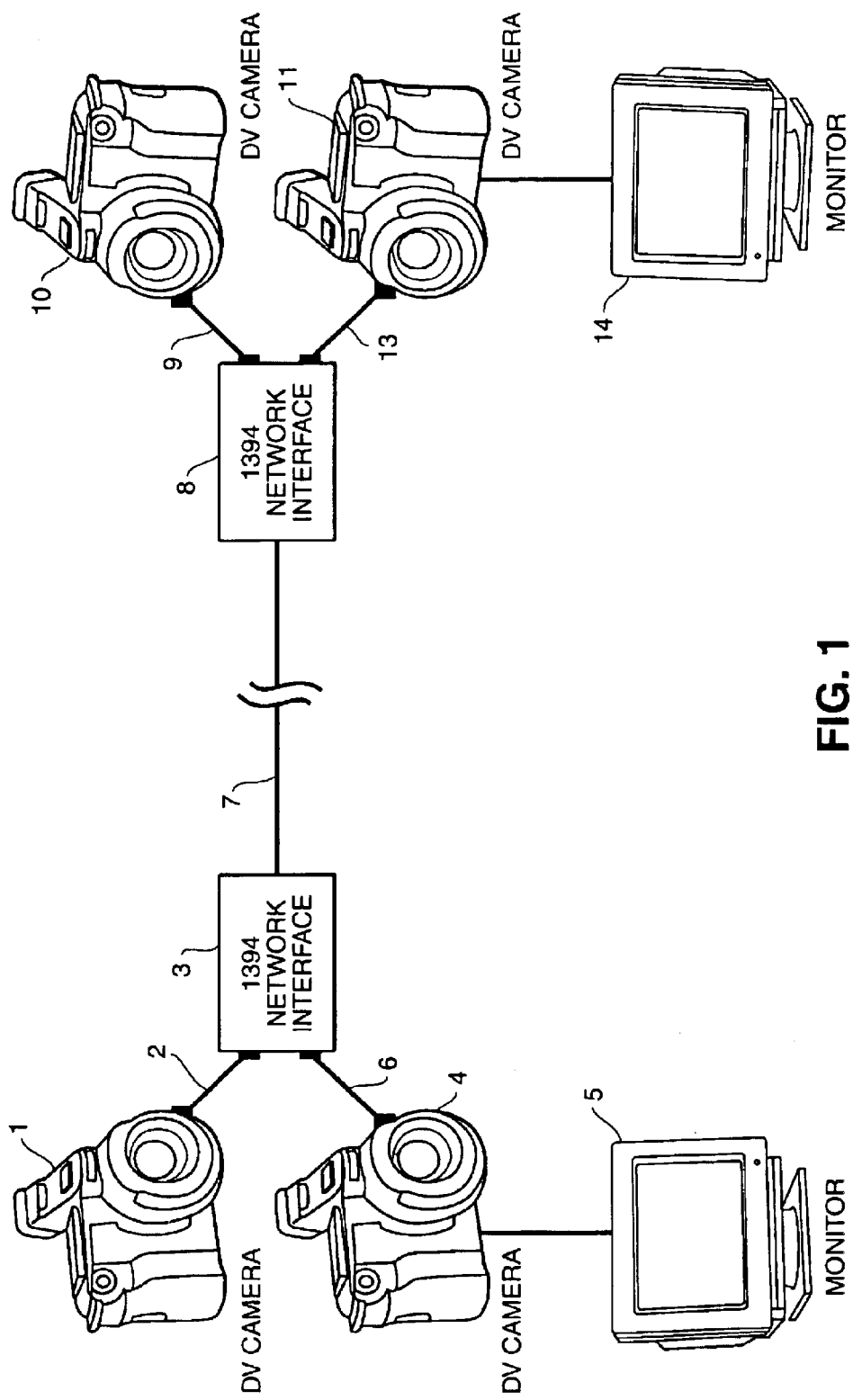
FIG. 1 is a block diagram of an IEEE 1394 network interface implemented in a bi-directional video conferencing system according to the present invention.

FIG. 1 is a block diagram representing a 1394 network interface for transferring and receiving data across a local area network from devices which send/receive data over the same IEEE 1394 broadcast channel. The 1394 network interface according to the present invention, shown in FIG. 1, is implemented within a bi-directional video conferencing system.

Shown in FIG. 1 is digital video (DV) camera 1, which may be a Canon Optura digital video camera or the like. In the present example, DV camera 1 is used for transmitting full motion digital video which includes both audio and video segments. DV camera 1 includes an IEEE 1394 interface connection. The IEEE 1394 interface connection is connected to a 1394 network interface 3 via an IEEE 1394 serial cable 2. The IEEE 1394 serial cable 2 carries packets of digital video data to the 1394 network interface 3. The video conferencing system shown in FIG. 1 also includes DV camera 4 which, in the present embodiment, receives full motion digital video data, decodes the data, and transmits the data in analog form to monitor 5 for audio and for display. Monitor 5 can be any type of monitor or television having an S-Video NTSC or other connection for receiving analog audio and video.

DV camera 4 receives digital video in data packets via IEEE 1394 cable 6 from 1394 network interface 3. Preferably, the digital video data which arrive in data packets are received by network interface 3 from local area network 7. However, it is possible that DV camera 4 could receive digital video data locally from DV camera 1. Digital video camera 4 decodes the digital video data packets and outputs the analog audio and video data to monitor 14. Monitor 14 can be any type of monitor or television which has an S-Video, NTSC or other connection for receiving analog audio and video data.

Depending on their configuration, DV cameras 1 and 4 can transmit/receive video data via 1394 network interface 3. 1394 network interface 3 has at least two 1394 interface connections for connecting with each 1394 serial cable connected to DV cameras 1 and 4 and has a network interface connection which connects to local area network 7.

In order to transmit large volumes of data, which is typically needed for transmitting digital video data, it is preferable that network 7 is a Gigabit Ethernet network. In this regard, U.S. patent application Ser. No. 09/166,487, entitled "Digital Video Network Interface", describes the method and system for interfacing 1394 network interface 3 between digital video cameras and a local area network, such as a Gigabit Ethernet network. Briefly, as described in that application, each of network interfaces 3 and 8 include send and receive buffers, which operate to buffer and translate isochronously-timed data to and from the asynchronously-timed data of the Gigabit Ethernet. The reader is directed to the disclosure in that document for further detailed explanation regarding communication between a 1394 network interface according to the present invention and local area network 7.

In the present embodiment, 1394 network interface 3 is implemented within a bi-directional video conferencing system. A transmitting DV camera and the receiving DV camera are connected at each end of local area network 7. This allows for simultaneous transmission and reception of audio/video from a local location to a remote location. As mentioned above, a Gigabit Ethernet network is preferably employed as local area network 7 since the data transfer rate per channel is very high, typically in a range of 30 Mbits/sec. As will be discussed below in greater detail with respect to FIG. 2, 1394 network interface 3 provides for the transmission and reception of data packets for devices that transmit/receive over the same IEEE 1394 broadcast channel. In the case where each of DV cameras 1 and 10 are set to transmit using channel 63 and cameras 4 and 11 are set to receive using channel 63, the 1394 network interface 3 resolves the problem of two devices, in the present case, DV camera 1 and DV camera 4, attempting to send and receive different data over the same broadcast channel 63 on the same 1394 bus. As will be discussed below, two separate 1394 buses are implemented to overcome channel conflicts.

Returning to FIG. 1, 1394 network interface 3 transmits/receives data packets over local area network 7 to/from 1394 network interface 8. 1394 network interface 8, which is at the remote side of local area network 7, acts in a similar fashion to 1394 network interface 3, and includes at least two IEEE 1394 interface connections and connects to 1394 serial bus cables 9 and 13. Cable 9 is connected with DV camera 10 which, in the present example, is a transmitting video camera for transmitting digital video data over the network through 1394 network interface 8. DV camera 11, in the present example, is used as a receiving camera for receiving and decoding digital video packets which output from 1394 interface network 8 through IEEE 1394 serial cable 13. After decoding each data packet, DV camera 11 outputs digital video in analog format directly to monitor 14 for viewing.

Figure 2:
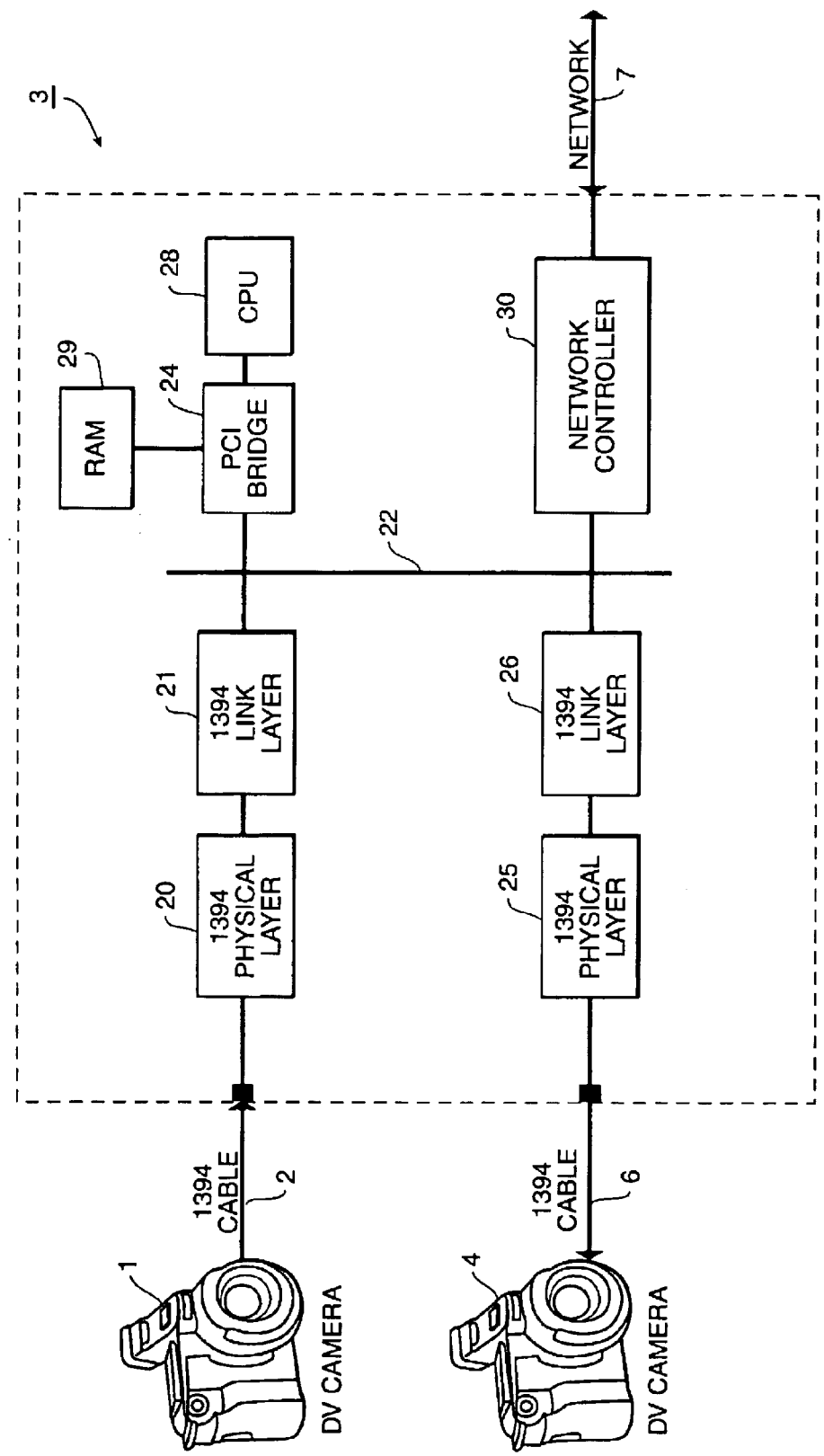
FIG. 2 is a block diagram of the 1394 network interface according to the present invention.

FIG. 2 is a block diagram depicting the internal hardware components of 1394 network interface 3. (1394 network interface 3 and 1394 network interface 8 are identical in hardware and in software and, therefore, a description of 1394 network interface 8 will not be presented for the purposes of brevity.)

Shown in FIG. 2 is DV camera 1 which is connected through 1394 cable 2 to 1394 network interface 3. According to the present invention, 1394 network interface 3 can be a stand-alone network card or can reside within a personal computer or the like. 1394 network interface 3 includes at least two 1394 interface connections for connecting with each of the DV cameras 1 and 4 and also includes a network interface connection for connecting to the local area network 7. 1394 network interface 3 receives data from DV camera 1 through its IEEE 1394 interface into 1394 physical layer 20.

Physical layer 20 is an IEEE 1394 hardware connection which provides electrical and mechanical interaction with 1394 cable 2. Link layer 21, which is connected to physical layer 20, is an IEEE 1394 interface link which receives 1394 formatted data, controls access to the 1394 bus, assigns channels to nodes using the bus (when, as here, the link layer is the isochronous resource manager), and verifies accuracy of the 1394 data packets. In addition, and under control of software, link layer 21 interprets the data and routes the data based on header information in the 1394 data packet. In this regard, the IEEE 1394 standard format for a data packet will be discussed in greater detail with respect to FIGS. 3A–3D.

After receiving and interpreting the data packet link layer 21 transmits the data over bus 22 which preferably is a Peripheral Component Interconnect (PCI) bus. PCI bridge 24 manages the flow of data through PCI bus 22 which connects components together in 1394 network interface 3, such as all 1394 link layers, CPU (Central Processing Unit) 28, random access memory (RAM) 29, network controller 30, and other components within 1394 network interface 3. In the present example, data packets that are received from local area network 7 are routed by PCI bridge 24 to link layer 26 (indirectly, through RAM 29) which outputs the data to physical layer 25. Physical layer 25 outputs the data packets through its electrical connection to DV camera 4, via the IEEE 1394 connection and 1394 cable 6. Prior to routing the data packet from RAM 29 through PCI bridge 24 to link layer 26, CPU 28 interprets information in the data packets to identify the source and recipient and, based on the information, routes the data packet to the intended recipient.

Upon receiving the data packet from local area network 7, network controller 30 transfers the data packet through the PCI bus via PCI bridge 24 which routes it to RAM 29. Network driver software, which operates in conjunction with network controller 30, removes network header information and unpackages the data from its network protocol format. CPU 28 outputs the data onto PCI bus 22 via PCI bridge 24, routed to the intended recipient. A 1394 header is added by the link layer to the data packet based on the source of the data packet and based on the intended recipient of the data packet. In the present embodiment, since DV camera 4 is the receiving camera, The 1394 header is added by link layer 26.

As mentioned previously, all DV cameras 1, 4, 10 and 11 have the same preset broadcast channel: broadcast channel 63. This causes a conflict when two or more DV cameras are attempting to transmit over the same 1394 bus. As discussed above, each 1394 link layer controls access to its bus to transmit and prevents more than one transmitter from using the same broadcast channel on the bus. In the present invention described with respect to FIG. 2, the conflict of two or more devices, such as DV cameras, at either side transmitting data over the same 1394 channel is addressed by providing more than one 1394 physical layer, 1394 link layer, and 1394 bus. Without such a solution, there would be a conflict between DV cameras attempting to transmit data over the same 1394 bus. In this regard, each link layer 21 and 26 receives data packets from each device in an IEEE 1394 standard format. In a videoconferencing environment, only one camera such as camera 1 transmits while the other camera (camera 4) receives. The channel 63 conflict occurs because camera 4 is intended to receive video data from a remote camera, but what it actually receives (because of the conflict) is video data from local camera 1.

Figure 3A:
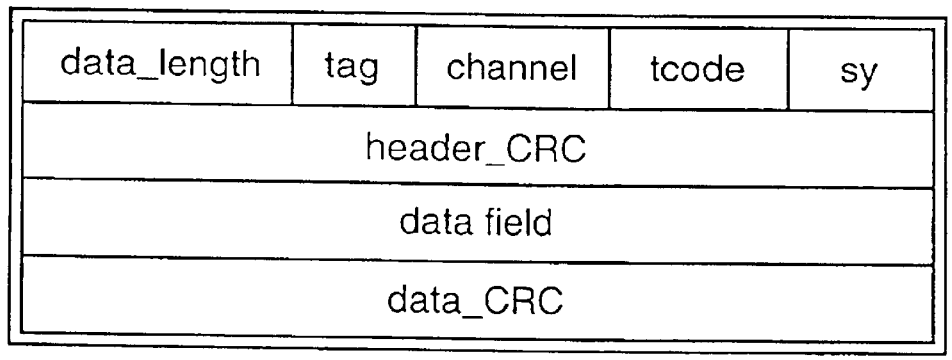
FIGS. 3A–3D, are a IEEE 1394 formatted isochronous data packet, an 1394 data field, a modified data packet with routing header and ID information, and a network packet containing network header information, routing information and data packet, respectively.

FIG. 3A illustrates a typical 1394 data packet. The fields and headers of the data packet have the following definitions:

Header: includes fields for data length, tag, channel, tcode and sy, all of which are described below.

Data_length: is the length of data in bytes.

tag: is the tag field, which defines the type of data being transmitted, i.e., digital video, facsimile data, etc.

channel: is the channel field which specifies the 1394 channel that this packet is being transmitted on. As mentioned previously, IEEE 1394 standard provides for 64 channels numbered 0-63.

tcode: is the transaction code that specifies what type of transaction shall be performed on the packet.

sy: is the synchronization code which is application specific.

header CRC: the CRC (Cyclical Redundancy Check) is provided to verify that the header was transmitted accurately.

data field: contains the data for the packet.

data CRC: the CRC (Cyclical Redundancy Check) is provided to verify that the data was transmitted accurately.

Upon receiving the 1394 data packet, physical layer 20 transmits the data packet to link layer 21. Link layer 21 and its software support interpret the data in the data packet and remove all non-data information including the header before transmitting a data packet which contains just the data field, shown in FIG. 3B. That is, link layer 21 strips off the 1394 header, the header CRC and the data CRC prior to forwarding the data packet onto PCI bus 22 via PCI bridge 24 which forwards the data packet to RAM 29 for use by CPU 28. When the data packet containing the data field is received, CPU 28 attaches to the data field an ID header, shown in FIG. 3C. The ID header, which is produced by CPU 28, contains link layer routing information which informs the receiving side as to which link layer should receive the data packet. In addition, the ID header includes information regarding the data and the transmitting device. After attaching appropriate header information, CPU 28 outputs the updated data packet containing the ID header onto PCI bus 22 via PCI bridge 24 which routes the data packet and header to network controller 30.

In the present embodiment, it is the task of the network controller 30 to negotiate access to local area network 7 and to buffer received data to/from the local area network. In addition, network controller 30 handles all timing requirements of sending/receiving data. In this regard, on the transmitting side, network controller 30 buffers both data packets to be sent once it has access to local area network 7 and data packets which have been received from the remote location. Associated network driver software either reformats or unpacks the data packets into/from specific network protocol and, in addition, attaches/removes a network header to the data packet which already contains an ID header and data field, shown in FIG. 3D. Upon receiving access to the network, network controller 30 outputs a data packet which now includes a network header, ID header and data field, shown in FIG. 3D. The network header provides information that identifies the contents of the data packet and the appropriate address on the network of the receiving network interface, in the present example, 1394 network interface 8.

The method by which 1394 network interface 3 receives and transmits data packets from its 1394 interfaces over local area network 7 will now be discussed in greater detail with respect to the flowcharts illustrated in FIGS. 4A and 4B.

FIG. 4A is a flowchart illustrating the receipt and transfer of data packets through 1394 network interface 3 to local area network 7. In step S400, 1394 network interface 3 receives a data packet from DV camera 1 via cable 2. The data packet is transmitted from physical layer 20 to link layer 21. In step S401, link layer 21 reviews the 1394 data packet, determines if it meets with the 1394 protocol and, in the case that it does, removes header information, header_CRC information, and data_CRC information, resulting in the data packet depicted in FIG. 3B. The data packet is then forwarded to CPU 28 across PCI bus 22 via PCI bridge 24.

Figure 3B:
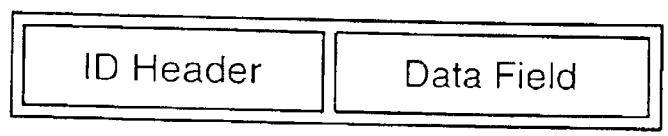
Figure 3C:
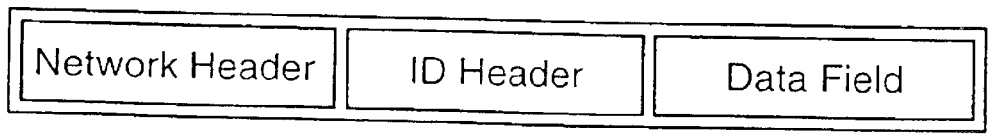
Figure 3D:
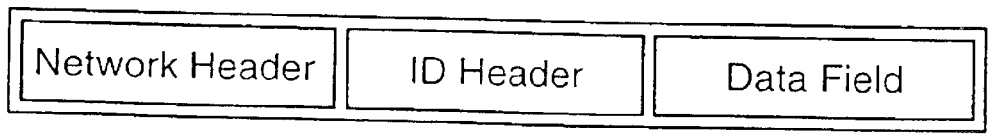

In step S403, based on the identity of the device that transmitted the data packet, and based on the type of data packet and the recipient of the data packet, CPU 28 modifies the data packet by attaching a routing and ID header which will direct the data packet to the intended recipient at the remote side of the local area network. The resulting data packet is depicted in FIG. 3C. Once the routing and ID header has been attached to the data packet, the data packet is transferred to network driver software (step S405) which attaches a network header to the data packet and repackages the data packets for transmission over the network in accordance with network protocol standards (step S406). The resulting data packet is depicted in FIG. 3D. In the case of a Gigabit Ethernet network, network driver software combines two or more (three are preferred) DV data packets together since the Gigabit Ethernet format can accept larger amounts of data in each packet than the IEEE 1394 protocol permits.

In step S407, the packaged data packets are sent to network controller 30 for transmission across the local area network. Upon receiving the data packet, network controller 30 begins to negotiate with local area network 7 for access to the network. However, as can be understood, access to the network is not guaranteed and, therefore, network controller 30 must continue to negotiate and handshake with network 7 in order to obtain access while at the same time buffering data packets in its internal transmit buffer. Once access to local area network 7 has been obtained, network controller 30 may send all the data packets in its buffer which have been repackaged into the appropriate network format and have appropriate network headers in a single burst across network 7.

Figure 4B:
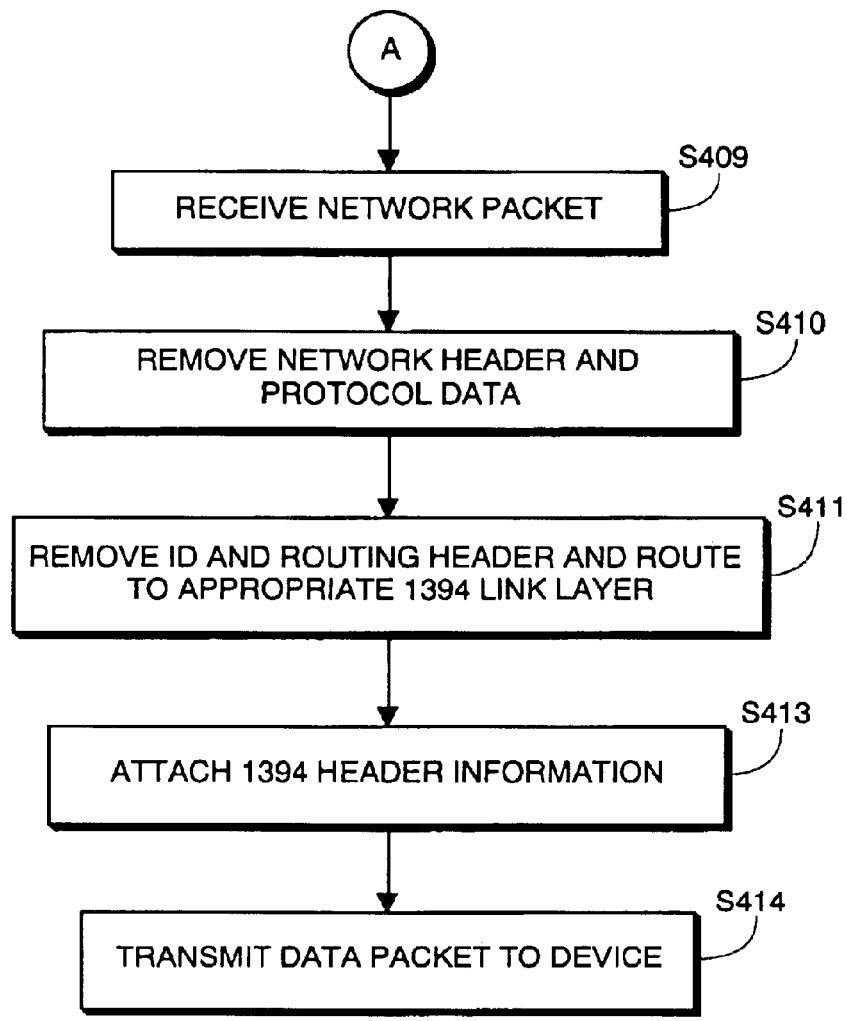

FIG. 4B is a flowchart illustrating the receipt and unpackaging of data packets through network interface 3. In this regard, DV camera 4 will be used in this example as the recipient of data packets sent across network 7 to 1394 network interface 3.

Upon receiving a network packet via network 7 in step S409, network controller 30 outputs data packets across the PCI bus via PCI bridge 24 to CPU 28. The network packet is unpackaged by network driver software into individual data packets in step S410. The packets are separated and the network headers are stripped off, and each data packet is reconstructed into individual data packets, each is much like that shown in FIG. 3C. CPU 28 removes the ID and routing header in step S411 and routes the data packet based on the ID and routing header to an appropriate 1394 link layer.

In step S413, and in accordance with the present example, the data packet is routed via PCI bus 22 to link layer 26. Upon receiving the data packet, which is now only in the format of a data field as shown in FIG. 3B, link layer 26 reconstructs the data packet into a 1394 standard format by rebuilding the 1394 header, the header_CRC, and the data_CRC, as shown in FIG. 3A. The data packet is then transmitted through physical layer 25 to the recipient device, DV camera 4, in step S414.

Although the data packet which was received by CPU 28 indicated that the data packet should be transmitted over channel 63 of the 1394 bus, CPU 28 interprets the router and ID header and identifies which of the link layers, in this example link layer 21 or 26, should receive the data packet based on the routing and ID header information supplied by the transmitting side.

A second embodiment of the present invention will now be described with respect to FIGS. 5, 6 and 7. In the second embodiment, each 1394 network interface is connected to more than two devices, of which at least two of the devices are using the same broadcast channel and the others may or may not be using the same broadcast channel.

Figure 5:
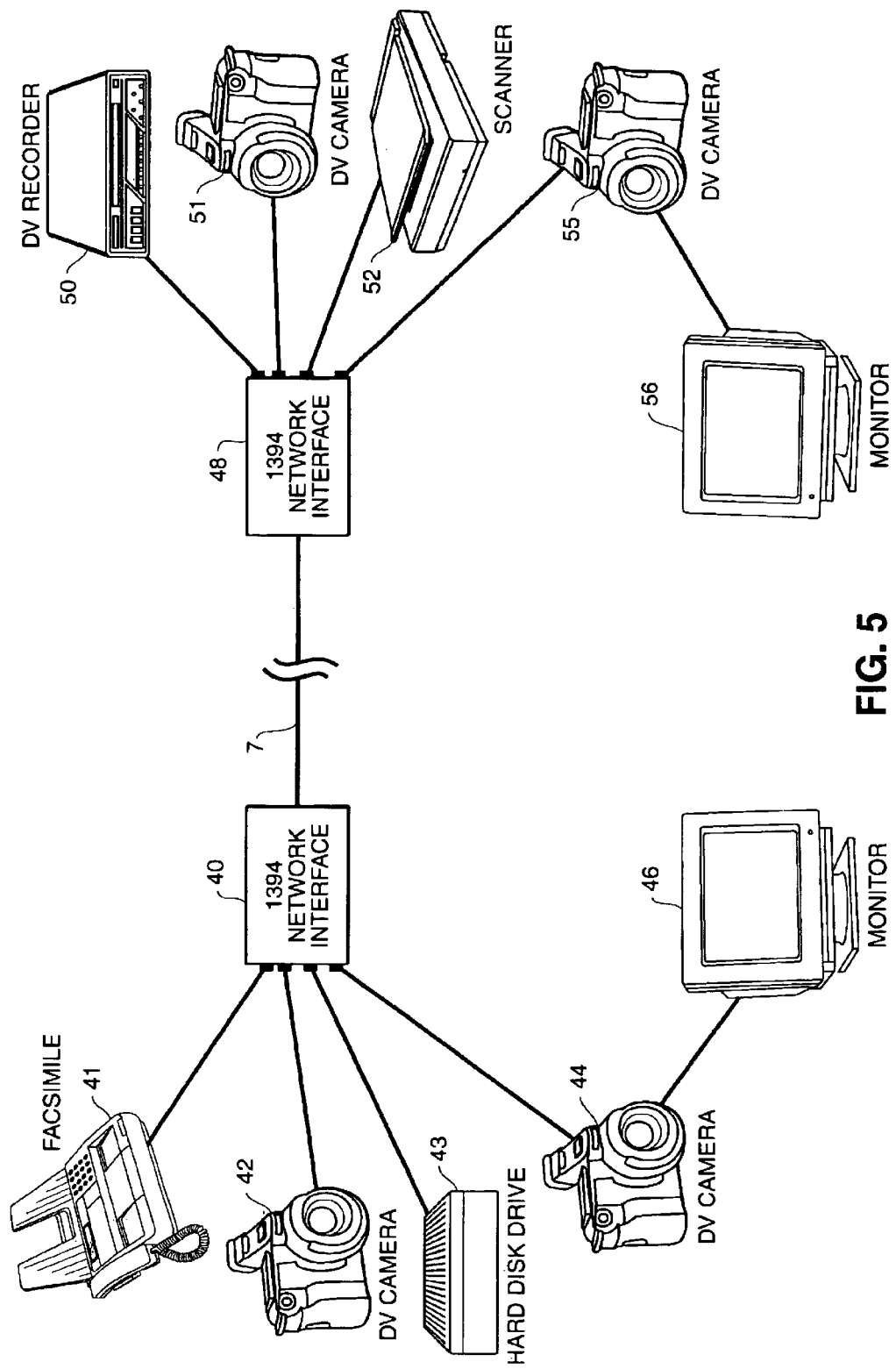
FIG. 5 is a 1394 network interface system according to a second embodiment of the present invention.

As shown in FIG. 5, 1394 network interface 40 is connected to multiple 1394 devices such as facsimile machine 41, DV camera 42, hard disk drive 43, and DV camera 44, which is also connected to monitor 46. Data from any one of facsimile machine 41, DV cameras 42 or 44 or hard disk drive 43 may be transmitted across local area network 7 to the receiving side, 1394 network interface 48. Network interface 48 has at least two IEEE 1394 interface connections which connect to multiple 1394 devices such as DV recorder 50, DV camera 51, scanner 52 and DV camera 55. DV camera 55, like DV camera 44, is connected to monitor 56 or the like. Data packets are sent and received from network interface 48 through local area network 7, which is preferably a Gigabit Ethernet network.

In the present embodiment shown in FIG. 5, only DV cameras 42, 44, 51 and 55 are transmitting over the same broadcast channel. Therefore, each of the DV cameras is provided with its own 1394 bus, physical layer and link layer, such that two channel 63 DV cameras do not coexist on the same physical IEEE 1394 bus. In the first embodiment explained with respect to FIG. 1, each link layer 21 and 26 had only one device that was transmitting or receiving data packets on channel 63. Consequently, CPU 28 in FIG. 2 only had to determine which link layer, 21 or 26, was the appropriate recipient or transmitter of a data packet. In the FIG. 5 embodiment, on the other hand, CPU 28 must determine, based on header and subheader information, which link layer and which channel of that link layer should receive the data packet.

In the embodiment shown in FIG. 5, facsimile 41, DV camera 42, and hard disk drive 43, are all interfaced with one physical layer and one link layer within 1394 network interface 40. That is, as shown in FIG. 7, on the exterior of 1394 network interface 40, facsimile 41, DV camera 42 and hard disk drive 43, each have a 1394 interface connection with physical layer 70 which transmits and receives data over the 1394 bus to/from link layer 71. On the other hand, DV camera 44 is connected to its own physical layer 74 and link layer 75 in 1394 network interface 40.

In order to distinguish which of the multiple devices connected to one link layer should receive a data packet, the data packet received by CPU 76 in network interface 40 must include sufficient information to allow the CPU to derive both the link layer and the channel number. For example, the header might also include a subheader. As shown in FIG. 6, each data packet according to the second embodiment contains a header which indicates which link layer receives the data and a subheader which indicates a channel within the link layer which should receive the data packet. Thus, the data packet which is received by CPU 76 includes not only a header but also a subheader attached to the data field.

A more detailed description as to how a data packet is received from the local area network and output to a 1394 interface device will now be discussed in greater detail with respect to FIG. 7. Upon receiving a data packet from network 7, the data packets are stored within network interface 78's internal buffer. After data packets have been received, or as they are being received, network controller 78 outputs each data packet over the PCI bus 82 via PCI bridge 73 to RAM 79. Network driver software removes the network header and unpackages the network packets and, if necessary, separates data packets in the case more than two (here, three are preferred) DV data packets have been combined for the particular network protocol.

Figure 6:
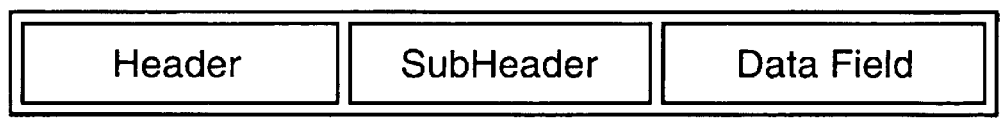
FIG. 6 is a modified 1394 formatted data packet containing header with ID and link layer routing information and a subheader which includes additional channel routing information.
Figure 7:
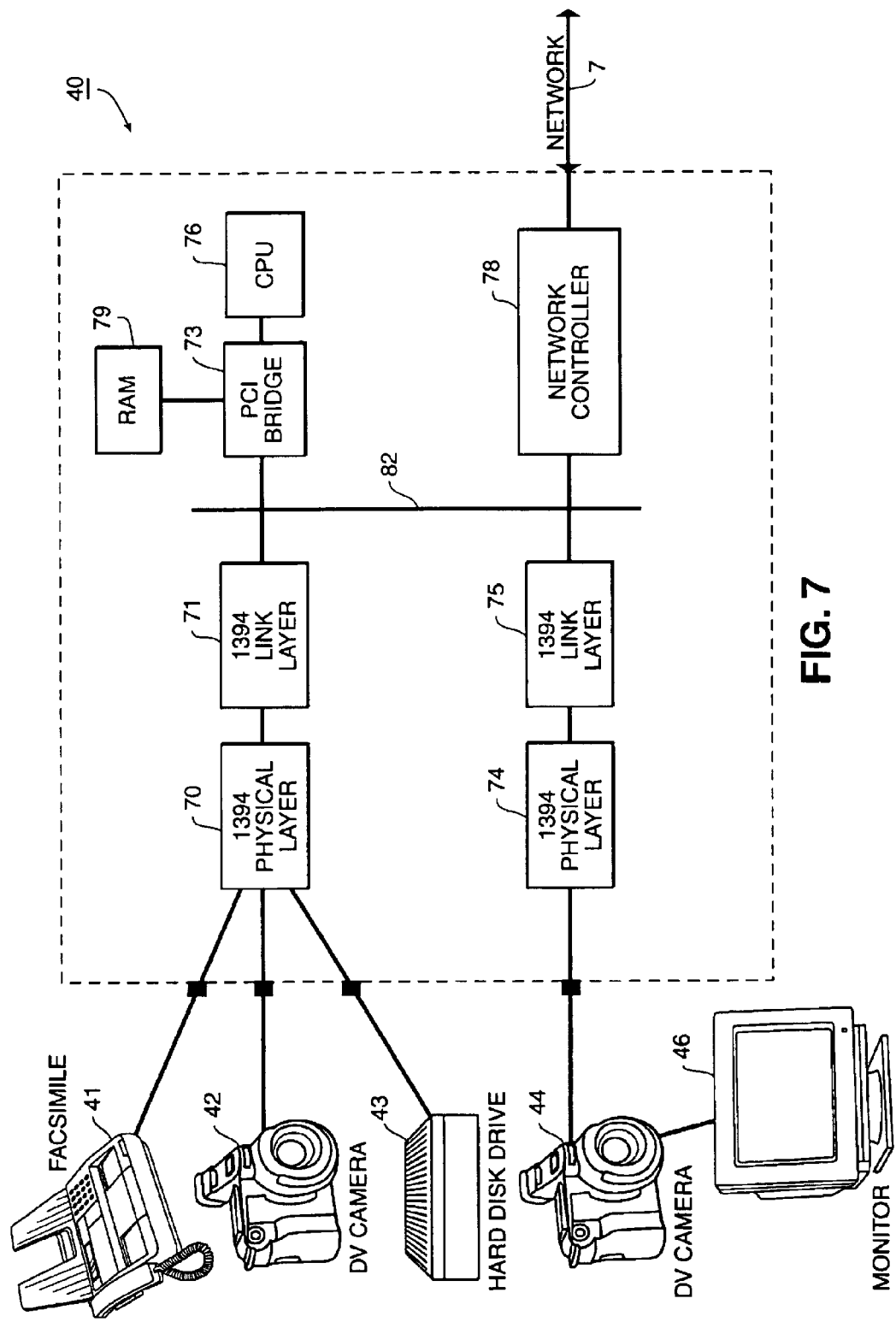
FIG. 7 is a block diagram of a 1394 network interface according to the second embodiment of the present invention.

As mentioned above, each data packet that CPU 76 receives includes a data field, a subheader and a header, as illustrated in FIG. 6. Based on the header information, CPU 76 identifies which link layer, 71 or 75, should receive the data packet. In addition, based on the subheader information, CPU 76 can identify which channel in link layer 71 or 75 should receive the data packet and, based on the channel's identity, CPU 76 provides the necessary routing information which the link layer will use to output the data packet over the correct 1394 broadcast channel. In the present example, the data packet received is intended for transmission over channel 62 which in this example is being used by hard disk drive 43.

After interpreting and removing each header and subheader, in the present example, CPU 76 transmits the data packet via PCI bridge 73 and PCI bus 82 to link layer 71. Link layer 71 rebuilds the data packet into a IEEE 1394 standard format for transmitting the data packet to hard disk drive 43 through physical layer 70.

It is because of the header and subheader information that CPU 76 determines where to route each data packet it receives from network controller 78 and controls which link layer receives the data packet, as well as which channel of the 1394 bus, controlled by that link layer, should be used to output the received data packet to the intended 1394 device.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for transmitting and receiving data packets formatted in IEEE 1394 standard, comprising:

a controller interfaced to an internal bus;

a first interface connected to the bus;

a first device using a broadcast channel and connected to the first interface:

a second interface connected to the bus; and a second device using the broadcast channel and connected to the second interface, wherein the controller is configured for 1) receiving data transmitted from one of the first and second devices via the bus, attaching an identification (ID) header to the received data, the ID header including identification information corresponding to a recipient device determined based at least in part on which of the first and second devices transmitted the data, and retransmitting the received data with the ID header onto the bus; and 2) receiving data with the ID header attached thereto, interpreting the ID header to identify which of the first or second interfaces should receive the data, and transmitting the data over the bus to the identified interface, wherein the ID header is other than a 1394 header formatted in IEEE 1394 standard and contains information about the data, and wherein the 1394 header is built based on information contained in the ID header.

2. A system according to claim 1, wherein the first device is a first digital video camera having a fixed broadcast channel and which transmits/receives digital video data isochronously through the first interface and the second device is a second digital video camera having the same fixed broadcast channel as the first digital video camera and which transmits/receives digital video data isochronously through the second interface.

3. A system according to claim 2, wherein the digital video data output from either the first or second video camera includes 1394 header information, data, and header check and data check information, and wherein a link layer for each respective interface removes the 1394 header and header check and data check information prior to transmitting the data over the bus to the controller.

4. A system according to claim 2, further comprising a network controller for accessing a local area network and for transmitting data with the ID header, wherein the network controller receives the data and the ID header, attaches a network header to the data and repackages the data with the ID header and network header into a network data packet and, upon receiving access to the local area network, transmits the network packet over the local area network to a receiving side network controller based on the attached network header.

5. A system according to claim 4, wherein received network data packets are unpackaged, network headers are removed, and the ID header is interpreted to identify which interface should receive the data.

6. A system according to claim 5, wherein a link layer of the identified interface attaches 1394 header and data information to the data and transmits the data through a physical layer to the identified interface in an isochronous manner and where, in the case the identified interface connects to the first digital video camera, the identified interface outputs the data in the isochronous manner to the first digital video camera and, in the case the identified interface connects to the second digital video camera, the identified interface outputs the data in the isochronous manner to the second digital video camera.

7. A system according to claim 6, further comprising a monitor for displaying analog video data output from either the first or second digital video camera.

8. A system according to claim 1, wherein the ID header identifies the type of data, the data recipient and amount of data.

9. A system according to claim 1, further comprising a network interface to a local area network.

10. A system according to claim 1, wherein the bus is a PCI bus.

11. A system for transmitting and receiving data packets formatted in IEEE 1394 standard comprising:
 a controller interfaced to an internal bus;
 a first interface connected to the bus;
 a first device using a broadcast channel and connected to the first interface;
 a second interface connected to the bus; and
 a second device using the broadcast channel and connected to the second interface,
 wherein the controller is configured for receiving data transmitted over the bus and routing the data to either the first or second interface based on the received data using an identification (ID) header other than a 1394 header, the ID header containing information about the data, and identification information corresponding to one of the first and second devices determined based at least in part on a transmitting device, and
 wherein the 1394 header is built based on information contained in the ID header.

12. A system according to claim 11, wherein the first device is a first digital video camera having a fixed broadcast channel and which transmits/receives digital video data isochronously through the first interface and the second device is a second digital video camera having the same fixed broadcast channel as the first digital video camera and which transmits/receives digital video data isochronously through the second interface.

13. A system according to claim 12, wherein the digital video data output from either the first or second video camera includes 1394 header information, data, and header and data check information, and wherein a link layer for each respective interface removes the 1394 header and header data check information prior to transmitting the data over the bus to the controller.

14. A system according to claim 12, further comprising a network controller for accessing a local area network and for transmitting data with the ID header, wherein the network controller receives the data and the ID header, attaches a network header to the data and repackages the data with the ID header and network header into a network data packet and, upon receiving access to the local area network, transmits the network packet over the local area network to a receiving side network controller based on the attached network header, wherein the ID header is other than a 1394 header formatted in IEEE 1394 standard.

15. A system according to claim 14, wherein received network data packets are unpackaged, network headers are removed, and the ID header is interpreted to identify which interface should receive the data.

16. A system according to claim 15, wherein a link layer of the identified interface attaches a 1394 header and data information to the data and transmits the data through a physical layer to the identified interface in an isochronous manner and where, in the case the identified interface connects to the first digital video camera, the identified interface outputs the data isochronously to the first digital video camera and, in the case the identified interface connects to the second digital video camera, the identified interface outputs the data isochronously to the second digital video camera.

17. A system according to claim 16, further comprising a monitor for displaying digital video data output from either the first or second digital video camera.

18. A system according to claim 11, further comprising a network interface to a local area network.

19. A system according to claim 11, wherein the bus is a PCI bus.

20. A system for transmitting and receiving data packets formatted in IEEE 1394 standard, comprising:
 a controller interfaced to an internal bus;
 a first interface connected to the bus;
 a first device using a broadcast channel and connected to the first interface
 a second interface connected to the bus; and
 a second device using the broadcast channel and connected to the second interface;
 wherein the controller is configured for 1) receiving data transmitted from one of the first and second devices via the bus, attaching an identification (ID) header and a subheader to the received data, the ID header including identification information corresponding to a recipient device determined based at least in part on which of the first and second devices transmitted the data, and retransmitting the received data with the ID header and subheader onto the bus; and 2) receiving data with ID header and subheader attached thereto, interpreting the ID header and subheader to identify which of the first or second interfaces should receive the data and which broadcast channel in the identified interface should receive the data, and transmitting the data over the bus to the identified interface, wherein the ID header is other than a 1394 header formatted in IEEE 1394 standard and contains information about the data, and wherein the 1394 is built based on information contained in the ID header.

21. A system according to claim 20, wherein the first device is a first digital video camera having a fixed broadcast channel and which transmits/receives digital video data isochronously through the first interface and the second device is a second digital video camera having the same fixed broadcast channel as the first digital video camera and which transmits/receives digital video data isochronously through the second interface.

22. A system according to claim 21, wherein the digital video data output from either the first or second video camera includes 1394 header information, data, and header check and data check information and wherein a link layer for each respective interface removes the 1394 header and header check and data check information prior to transmitting the data over the bus to the controller.

23. A system according to claim 21, further comprising a network controller for accessing a local area network and for transmitting data with the ID header and subheader, wherein the network controller receives the data and the ID header and subheader, attaches a network header to the data and repackages the data with the ID header and subheader and network header into a network data packet and, upon receiving access to the local area network, transmits the network packet over the local area network to a receiving side network controller based on the attached network header.

24. A system according to claim 23, wherein received network data packets are unpackaged, network headers are removed, and the ID header and subheader are interpreted to identify which interface and channel in that interface should receive the data.

25. A system according to claim 24, wherein a link layer of the identified interface attaches a 1394 header and data information to the data and transmits the data through a physical layer to the identified interface in an isochronous manner and where, in the case the identified interface connects to the first digital video camera, the identified interface outputs the data in the isochronous manner to the first digital video camera and, in the case the identified interface connects to the second digital video camera, the identified interface outputs the data in the isochronous manner to the second digital video camera.

26. A system according to claim 25, further comprising a monitor for displaying analog video data output from either the first or second digital video camera.

27. A system according to claim 20, further comprising a network interface to a local area network.

28. A system according to claim 20, wherein the bus is a PCI bus.

29. A method for use in a system for transmitting and receiving data packets formatted in IEEE 1394 standard, the method comprising steps of:

receiving data from an internal bus, which is connected to a first interface and a second interface, wherein a first device is connected to the first interface and uses a broadcast channel and a second device is connected to the second interface and uses the broadcast channel, attaching an identification (ID) header to the received data;

retransmitting the received data with the ID header onto the bus;

receiving data with the ID header attached thereto;

interpreting the ID header to identify which of the first or second interfaces should receive the data; and transmitting the data over the bus to the identified interface, wherein the ID header is other than a 1394 header formatted in IEEE 1394 standard and contains information about the data and identification information corresponding to a recipient device determined based at least in part on a transmitting device; and wherein the 1394 header is built based on information contained in the ID header.

30. A method for use in a system for transmitting and receiving data packets formatted in IEEE 1394 standard, the method comprising steps of:

receiving data over an internal bus, which is connected to a first interface and a second interface, wherein a first device is connected to the first interface and uses a broadcast channel and a second device is connected to the second interface and uses the broadcast channel; and routing the data to either the first or second interface based on the received data using an identification (ID) header other than a 1394 header, the ID header containing information about the data and identification information corresponding to one of the first and second device determined based at least in part on a transmitting device, and wherein the 1394 header is built based on information contained in the ID header.

31. A method for use in a system for transmitting and receiving data packets formatted in IEEE 1394 standard, the method comprising the steps of:

receiving data from an internal bus, which is connected to a first interface and a second interfaces, wherein a first device is connected to the first interface and uses a broadcast channel and a second device is connected to the second interface and uses the broadcast channel, attaching an identification (ID) header and a subheader to the received data;

retransmitting the received data with the ID header and subheader onto the bus;

receiving data with the ID header and subheader attached thereto;

interpreting the ID header and subheader to identify which of the first or second interfaces should receive the data and which broadcast channel in the identified interface should receive the data; and transmitting the data over the bus to the identified interface, wherein the ID header is other than a 1394 header formatted in IEEE 1394 standard and contains information about the data and identification information corresponding to a recipient device determined based at least in part on a transmitting device; and wherein the 1394 header is built based on information contained in the ID header.

32. A system for transmitting and receiving data packets formatted in IEEE 1394 standard, comprising:

a controlling means interfaced to a communication means;

a first interface means connected to the communication means;

a first device using a broadcast channel and connected to the first interface means;

a second interface means connected to the communication means; and a second device using the broadcast channel and connected to the second interface means, wherein the controlling means is configured for 1) receiving data transmitted from one of the first and second devices via the communication means, attaching an identification (ID) header to the received data, the ID header including identification information corresponding to a recipient device determined based at least in part on which of the first and second devices transmitted the data, and retransmitting the received data with the ID header onto the communication means; and 2) receiving data with the ID header attached thereto, interpreting the ID header to identify which of the first or second interface means should receive the data, and transmitting the data over the communication means to the identified interface means, wherein the ID header is other than a 1394 header formatted in IEEE 1394 standard and contains information about the data, and wherein the 1394 header is built based on information contained in the ID header.

33. A system for transmitting and receiving data packets formatted in IEEE 1394 standard, comprising:

a controlling means interfaced to a communication means;

a first interface means connected to the communication means;

a first device using a broadcast channel and connected to the first interface means;

a second interface means connected to the communication means; and a second device using a broadcast channel and connected to the second interface means, wherein the controlling means is configured for receiving data over the communication means and routing the data to either the first or second interface means based on the received data using an identification (ID) header other than a 1394 header, the ID header containing information about the data and identification information corresponding to one of the first and second devices determined based at least in part on a device which transmitted the data, wherein the 1394 header is built based on information contained in the ID header.

34. A system for transmitting and receiving data packets formatted in IEEE 1394 standard, comprising:

a controlling means interfaced to a communication means;

a first interface means connected to the communication means; and a first device using a broadcast channel and connected to the first interface means;

a second interface means connected to the communication means; and a second device using the broadcast channel and connected to the second interface means, wherein the controlling means is configured for 1) receiving data transmitted from one of the first and second devices via the communication means, attaching an identification (ID) header and a subheader to the received data, the ID header including identification information corresponding to a recipient device determined based at least in part on which of the first and second devices transmitted the data, and retransmitting the received data with the ID header and subheader onto the communication means; and 2) receiving data with the ID header and subheader attached thereto, interpreting the ID header and subheader to identify which of the first or second interface means should receive the data and which broadcast channel in the identified interface means should receive the data, and transmitting the data over the communication means to the identified interface means, wherein the ID header is other than a 1394 header formatted in IEEE standard and contains information about the data, and wherein the 1394 header is built based on information contained in the ID header.

* * * * *

UNITED STATES PATENT AND TRADEMARK OFFICE
CERTIFICATE OF CORRECTION

| | |
|---|---|
| PATENT NO. | : 7,013,354 B1 |
| APPLICATION NO. | : 09/166488 |
| DATED | : March 14, 2006 |
| INVENTOR(S) | : Gregory F. Beck et al. |

It is certified that error appears in the above-identified patent and that said Letters Patent is hereby corrected as shown below:

Title Page, item [57]
<u>IN THE ABSTRACT</u>
      The Abstract should read as follows:

--A system for transmitting and receiving data formatted in IEEE 1394 standard between devices using a same IEEE 1394 broadcast channel includes a bus, to which is connected a controller, and first and second 1394 interfaces. First and second devices, which are connected (respectively) to the first and second interfaces, use the broadcast channel. The CPU is configured for 1) receiving data from either the first or second device, attaching an ID header, which includes indentification information on a recipient device based at least in part on a transmitting device, and retransmitting the received data with the ID header onto the bus, and 2) receiving data with the ID header, interpreting the header to identify which of the first or second interfaces should receive the data, and transmitting the data to the indentified interface. The ID header contains information about the data and is used to build the 1394 header.--

<u>Column 3</u>
      Line 6, "The ID header , which is other than a 1394 interface." should be deleted.

<u>Column 16</u>
      Line 2, "device" should read --transmitting device, and--; and
      Line 3, "which transmitted the data" should be deleted.

Signed and Sealed this

Fourteenth Day of November, 2006

JON W. DUDAS
*Director of the United States Patent and Trademark Office*